United States Patent [19]

Protopapas

[11] Patent Number: 4,928,273

[45] Date of Patent: May 22, 1990

[54] TIME DIVISION MULTIPLEXER/DEMULTIPLEXER WITH DETERMINISTIC TIME SLOT ASSIGNMENT

[75] Inventor: Dimitrios Protopapas, Huntington, Conn.

[73] Assignee: Unisys Corporation, Blue Bell, Pa.

[21] Appl. No.: 313,005

[22] Filed: Feb. 21, 1989

[51] Int. Cl.$^5$ .............................................. H04J 3/16
[52] U.S. Cl. ................................... 370/85.7; 370/95.1
[58] Field of Search ....................... 370/84, 85.7, 95.1

[56] References Cited

U.S. PATENT DOCUMENTS 3,982,074  9/1976  Clark ...................................... 370/84
4,071,701  1/1978  Leijonhufund et al. .............. 370/84
4,763,319  8/1988  Rozenblit ............................. 370/84

Primary Examiner—Douglas W. Olms
Assistant Examiner—Melvin Marcelo
Attorney, Agent, or Firm—Albert B. Cooper; Mark T. Starr; Robert S. Bramson

[57] ABSTRACT

A frame building procedure for use in time division multiplexer systems for building a frame with N slots numbered #1, #2, #3, ... #N in increasing time order. A slot assignment sequence is generated in successive iterations I by initially assigning slot #1 as the first assignment in the sequence. $N/2^I$ is added to the slot numbers of all previously assigned slots during each iteration. Additionally, during each iteration, I is incremented by unity. The iterations are performed until all N slots are assigned when $N/2^I = 1$.

22 Claims, 5 Drawing Sheets

| SLOT ASSIGNMENT SEQUENCE NUMBER s | SLOT # S(s) | N = 32 | |
|---|---|---|---|
| 1 | 1 | 1 | |
| 2 | 1 + (N/2) | 17 | |
| 3 | 1 + (N/4) | 9 | |
| 4 | 1 + (3N/4) | 25 | |
| 5 | 1 + (N/8) | 5 | CHANNEL 1 |
| 6 | 1 + (5N/8) | 21 | |
| 7 | 1 + (3N/8) | 13 | |
| 8 | 1 + (7N/8) | 29 | |
| 9 | 1 + (N/16) | 3 | |
| 10 | 1 + (9N/16) | 19 | |
| 11 | 1 + (5N/16) | 11 | CHANNEL 2 |
| 12 | 1 + (13N/16) | 27 | |
| 13 | 1 + (3N/16) | 7 | |
| 14 | 1 + (11N/16) | 23 | |
| 15 | 1 + (7N/16) | 15 | |
| 16 | 1 + (15N/16) | 31 | |
| 17 | 1 + (N/32) | 2 | |
| 18 | 1 + (17N/32) | 18 | |
| 19 | 1 + (9N/32) | 10 | |
| 20 | 1 + (25N/32) | 26 | |
| 21 | 1 + (5N/32) | 6 | |
| 22 | 1 + (21N/32) | 22 | |
| 23 | 1 + (13N/32) | 14 | |
| 24 | 1 + (29N/32) | 30 | |
| 25 | 1 + (3N/32) | 4 | |
| 26 | 1 + (19N/32) | 20 | |
| 27 | 1 + (11N/32) | 12 | |
| 28 | 1 + (27N/32) | 28 | |
| 29 | 1 + (7N/32) | 8 | |
| 30 | 1 + (23N/32) | 24 | |
| 31 | 1 + (15N/32) | 16 | |
| 32 | 1 + (31N/32) | 32 | |
| 33 | 1 + (N/64) | | |
| ⋮ | ⋮ | | |
| N | N | | |

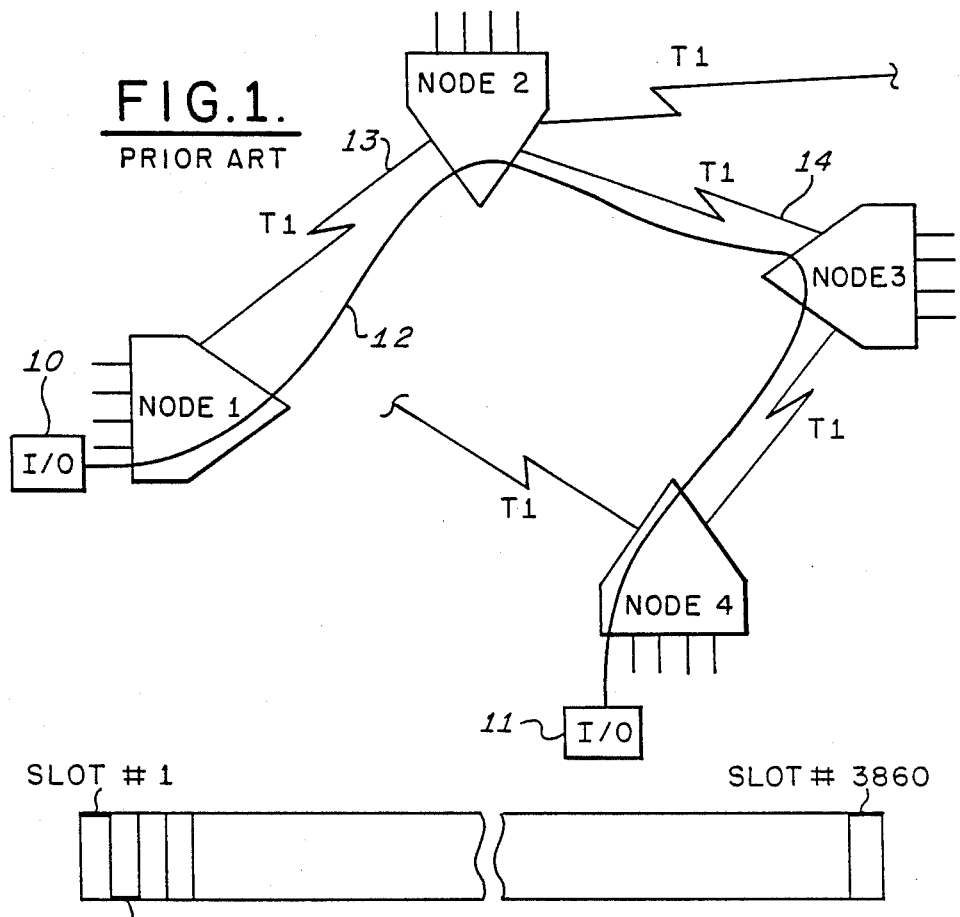
FIG.1. PRIOR ART
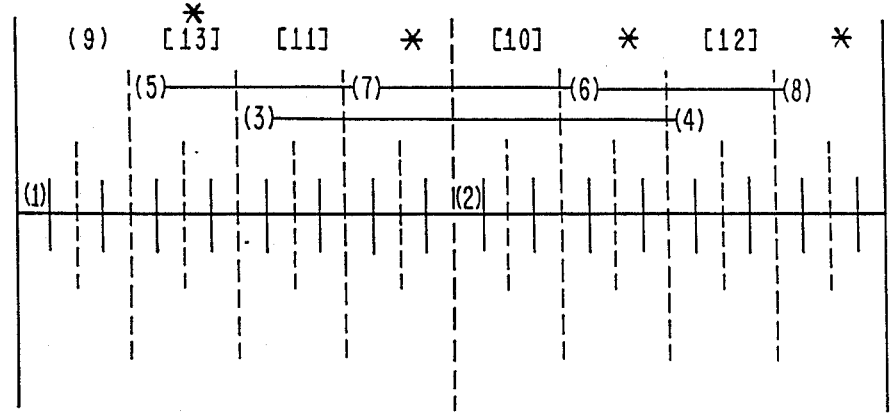
FIG.3. PRIOR ART
FIG.8.

| SLOT ASSIGNMENT SEQUENCE NUMBER s | SLOT # S(s) | N = 32 | |
|---|---|---|---|
| 1 | 1 | 1 | ⎫ |
| 2 | 1 + (N/2) | 17 | |
| 3 | 1 + (N/4) | 9 | |
| 4 | 1 + (3N/4) | 25 | ⎬ CHANNEL 1 |
| 5 | 1 + (N/8) | 5 | |
| 6 | 1 + (5N/8) | 21 | |
| 7 | 1 + (3N/8) | 13 | |
| 8 | 1 + (7N/8) | 29 | ⎭ |
| 9 | 1 + (N/16) | 3 | ⎫ |
| 10 | 1 + (9N/16) | 19 | |
| 11 | 1 + (5N/16) | 11 | ⎬ CHANNEL 2 |
| 12 | 1 + (13N/16) | 27 | |
| 13 | 1 + (3N/16) | 7 | ⎭ |
| 14 | 1 + (11N/16) | 23 | |
| 15 | 1 + (7N/16) | 15 | |
| 16 | 1 + (15N/16) | 31 | |
| 17 | 1 + (N/32) | 2 | |
| 18 | 1 + (17N/32) | 18 | |
| 19 | 1 + (9N/32) | 10 | |
| 20 | 1 + (25N/32) | 26 | |
| 21 | 1 + (5N/32) | 6 | |
| 22 | 1 + (21N/32) | 22 | |
| 23 | 1 + (13N/32) | 14 | |
| 24 | 1 + (29N/32) | 30 | |
| 25 | 1 + (3N/32) | 4 | |
| 26 | 1 + (19N/32) | 20 | |
| 27 | 1 + (11N/32) | 12 | |
| 28 | 1 + (27N/32) | 28 | |
| 29 | 1 + (7N/32) | 8 | |
| 30 | 1 + (23N/32) | 24 | |
| 31 | 1 + (15N/32) | 16 | |
| 32 | 1 + (31N/32) | 32 | |
| 33 | 1 + (N/64) | | |
| ⋮ | ⋮ | | |
| N | N | | |

FIG.6.

| SLOT # | CHANNEL # |
|---|---|
| 1 | 1 |
| 2 | |
| 3 | 1 |
| 4 | |
| 5 | 1 |
| 6 | |
| 7 | 2 |
| 8 | |
| 9 | 1 |
| 10 | |
| 11 | 2 |
| 12 | |
| 13 | 1 |
| 14 | |
| 15 | |
| 16 | |
| 17 | 1 |
| 18 | |
| 19 | 2 |
| 20 | |
| 21 | 1 |
| 22 | |
| 23 | |
| 24 | |
| 25 | 1 |
| 26 | |
| 27 | 2 |
| 28 | |
| 29 | 1 |
| 30 | |
| 31 | |
| 32 | |

FIG.7.

TIME DIVISION MULTIPLEXER/DEMULTIPLEXER WITH DETERMINISTIC TIME SLOT ASSIGNMENT

BACKGROUND OF THE INVENTION

1. Field of the Invention

The invention relates to time division multiplexers/demultiplexers (TDM), particularly with respect to time slot assignment procedures for frame building.

2. Description of the Prior Art

Present day communication networks comprise a plurality of nodes interconnected by a plurality of communication links or transmission facilities. For example, the T1 transmission facility provides communication at a rate of 1.544 Mbps (megabits per second). Alternatively, lower rate as well as higher rate links may be utilized such as the 56 Kbps (kilobits per second) DDS link or the T3 facility having a capacity equivalent to 28 T1 links. I/O devices such as data terminals, PBXs, CPUs and the like are connected to the various nodes to communicate information to each other. The communicated information is, for example, data or voice and is transmitted over the links in digital form. Communication between two particular I/O devices connected at diverse nodes is effected by establishing a circuit or channel therebetween. The information is communicated over the channel through the various nodes and over the various interconnecting links between the two I/O devices. Thus, the network provides channels between the various I/O equipments desiring to use the network for intercommunication therebetween.

Typically, an I/O device transmits data at a uniform clock rate. In order for an I/O device to receive the information, it must lock to the incoming data stream. The incoming bits usually vary from nominal uniform spacing and the amount of non-uniformity is denoted as jitter. A particular channel can tolerate a predetermined amount of jitter before data transmission is disrupted.

The information is transmitted from one node to the next over the interconnecting facility in frames at a constant transmission rate. Each frame is comprised of a plurality of contiguous time slots, for example, 3860 time slots of 400 bps each. The data rate associated with each time slot is denoted as the "bandwidth" of the slot. The term bandwidth is also utilized to denote the data rate of the link as well as the data rate of the device.

In order to establish a channel between two I/O devices, a plurality of time slots of the frame are assigned to the channel. The number of slots per frame required is determined by the bandwidth of the device and the bandwidth of the time slots. The frame width, in terms of the total number of slots, is dependent on the bandwidth of a slot and the bandwidth of the links. In the above example, if the device requires a 9600 bps synchronous rate, 24 time slots in the frame are assigned to the channel (9600/400). The remaining time slots in the frame are assigned to other channels. This technique is denoted as time division multiplexing (TDM). Thus, each node of the network is implemented with a TDM multiplexer. The TDM multiplexer includes a microprocessor that assigns the channels requiring service to the time slots of the frame and stores the channel assignments in frame tables in memory. Each time slot may convey a data bit, a data character or one or more data bytes.

It is a desideratum in the time division multiplexing technology to assign the time slots to each channel as uniformly as possible across the frame. Uniform time slot dispersion is desired so that the receiving I/O device can phase lock to the data stream. For example, with a frame that is 1000 slots wide, a channel requiring 100 slots per frame is ideally positioned on the network if successive slots of the channel have 10 slots therebetween. If the channel required 50 time slots on the frame, the ideal spacing would be 20 slots between successive assignments. In the prior art, a heuristic trial and error procedure is generally utilized to assign the channels desiring service to a frame. Such a procedure is often referred to as frame building. The number of slots in the frame required for the first channel is calculated. If the frame is initially empty, the first channel placed on the network may be assigned time slots with substantially ideal uniformity. As additional channels are placed on line, slots required for ideal positioning may be occupied by a previously assigned channel thereby resulting in time slot collisions. When collision occurs, a non-uniform placement of a channel slot is attempted. If the non-uniformity exceeds the maximum jitter that the channel can tolerate, a different assignment of the time slots to the channel is attempted. For example, a new starting slot for the channel may be tried to determine if acceptable jitter for the channel can be achieved. On a crowded network, it may be necessary to attempt a complete frame reassignment in order to endeavor to accommodate a new channel. Thus, it is appreciated that the time slots for a channel cannot be assigned arbitrarily. The positions of the time slots assigned to a channel are in accordance with the maximum jitter that the channel can tolerate. Because of the heuristic nature of the prior art procedures, placement of a channel on the network is not guaranteed even though adequate spare bandwidth exists.

It is appreciated that the prior art heuristic frame building procedures utilize very time consuming search procedures in endeavoring to place channels on the network. Consequently, in the event of network failure, the prior art frame building procedures introduce inordinate delays in rerouting and reconnecting disconnected channels. Additionally, significant amounts of bandwidth are wasted utilizing the prior art approaches. Even though spare bandwidth exists which is adequate for the placement of a new channel, the prior art procedures may not successfully interleave the new channel into the spare bandwidth without exceeding the jitter tolerance for the channel. At that point, the network would be considered fully occupied even though unused bandwidth is available.

Output buffering may be utilized, to some extent, to obviate the problems caused by time slot non-uniformity on a channel. A reserve of characters must be accumulated in a buffer before uniform transmission from the buffer can be initiated to the I/O device. Excessive buffering can introduce undesirably large network propagation delays.

The prior art frame building procedures create serious problems in the implementation of features such as channel bumping and bandwidth reservation. A priority channel that desires access to a crowded network may replace one or more lower priority channels. However, even though the bandwidth economized from the lower priority channels is adequate, it may not be possible to accommodate the high priority channel at the required jitter level. Additionally, reservation of adequate bandwidth for a channel does not guarantee that it will be possible to accommodate that channel in the frame.

Some networks utilize large bandwidth time slots in order to obviate the above-described problems. The larger the time slot bandwidth, the smaller will be the number of slots in the frame. Since bandwidth can only be assigned in large increments because of the data rates of present day I/O devices, this approach is excessively wasteful of bandwidth.

As discussed above, the prior art frame building procedures endeavor to assign to a channel time slots that are dispersed in the frame as uniformly as possible to minimize inter-character jitter thereby reducing network delays. When endeavoring to place a channel on the network, various starting slots for the channel are attempted to ascertain the most uniform distribution for that channel considering the time slot occupancy of previously assigned channels. If the inter-character jitter is greater than can be tolerated by the channel, the channel is denied access to the network even though adequate spare bandwidth exists. Although the frame is considered to be occupied to the acceptable level of inter-character jitter, a significant amount of bandwidth is wasted. Alternatively, the frame may be rebuilt to accommodate the channel utilizing the excessively time consuming prior art procedures. Non-uniform placement of the time slots causes jitter in the phase lock acquisition of the receiving I/O devices. As discussed above, the channel can tolerate a certain amount of such inter-character jitter but excessive non-uniformity imposed by the prior art heuristic approaches may deny channels access to the network.

SUMMARY OF THE INVENTION

The frame building procedure of the present invention deterministically assigns time slots in a frame with N slots, the slots being considered numbered #1, #2, #3, . . . ,#N in increasing time order. The slots are sequentially assigned and a slot assignment sequence is generated beginning with an empty frame by assigning slot #1 to the first slot in the slot assignment sequence. Further slot assignments are performed in iterations with an iteration index I starting with I=1. During each iteration, $N/2^I$ is added to the slot numbers of all of the previously assigned slots to obtain further assignments. The index I is incremented by unity after each iteration performing the last iteration with $N/2^I=1$. All N slots have then been assigned. Preferably, a slot assignment sequence table is generated establishing the correlation of the slot assignment sequence with the slot numbers.

The slots are sequentially assigned to the channels in the order of the slot assignment sequence and the slots assigned to a channel are utilized in increasing time sequence for data transmission on the channel.

This deterministic frame building procedure is collision free, utilizes the full bandwidth of the frame and maximizes the uniformity of dispersion of the slots assigned to each channel thereby limiting inter-character jitter to tolerable levels.

BRIEF DESCRIPTION OF THE DRAWINGS

FIG. 1 is a schematic diagram of a communication network having transmission facilities supporting multiple TDM channels.

FIG. 3 is a diagram depicting a TDM frame.

FIG. 6 is a slot number assignment table constructed utilizing the flow charts of FIG. 4 and 5. FIG. 6 also includes, as an example, the slot sequence for N=32.

FIG. 7 is a table that exemplifies the type of frame table that may be utilized in correlating the frame slots, as assigned in accordance with the present invention, with the channels to which the slots are assigned.

FIG. 8 is a diagram exemplifying a TDM frame with two channels distributed therein.

DESCRIPTION OF THE PREFERRED EMBODIMENT

Figure 2:
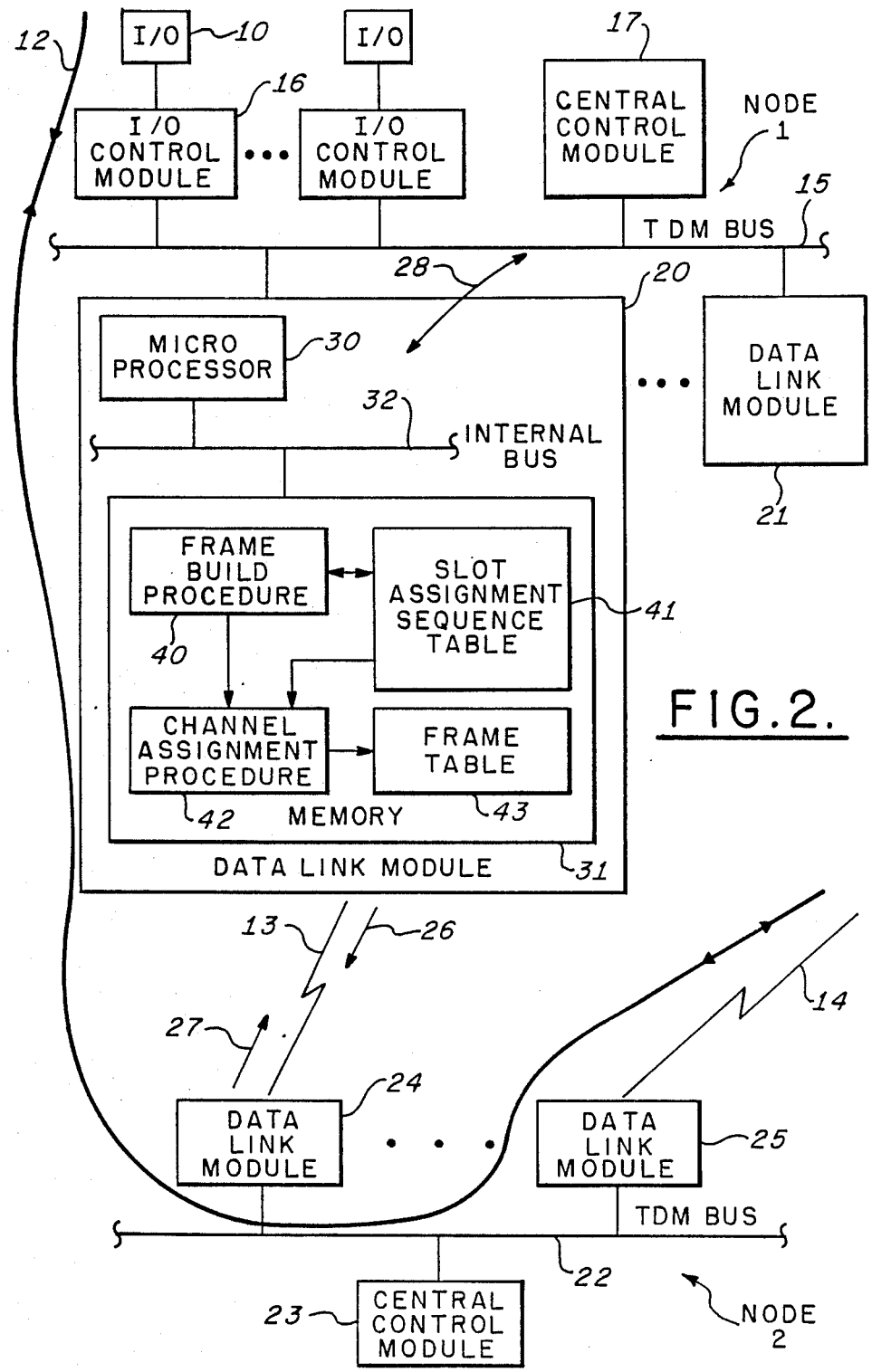
FIG. 2 is a schematic diagram of a TDM multiplexer for use in the communication network of FIG. 1 including details of the data link modules thereof.

Referring to FIG. 1, a communication network is illustrated having a plurality of nodes; e.g., node 1, node 2, node 3 and node 4, interconnected by a plurality of bi-directional communication links such as the T1 transmission facility. If an I/O device 10 at an input to node 1 desires communication with an I/O device 11 connected at node 4, an end-to-end channel or path 12 is established from node-to-node along the interconnecting T1 links such as a link 13 interconnecting node 1 and node 2 and a link 14 interconnecting node 2 and node 3. The time division multiplexers at the respective nodes assign time slots to channel 12 along each of the transmission links comprising the circuit. The TDM equipment at each node may service a plurality of I/O devices as well as a plurality of incoming links for retransmission to further nodes.

Referring to FIG. 2, in which like reference numerals indicate like components with respect to FIG. 1, a logical diagram of a T1 multiplexer is illustrated. As discussed above, each of the nodes of the network includes a multiplexer. Each of the multiplexers, such as the multiplexer of node 1, includes a TDM bus 15. The I/O device 10 is coupled to the TDM bus 15 via a conventional I/O control module 16. The other I/O devices of node 1 are also coupled to the TDM bus 15 via respective I/O control modules. A central control module 17 is coupled to the TDM bus 15 to perform supervisory control functions in a well known manner.

The multiplexer of node 1 includes a data link module 20 for node 1 communication with link 13. The data link module 20 is coupled to the TDM bus 15. The node 1 multiplexer includes further data link modules such as a module 21 for node 1 communication with other links serviced by the node. The node 2 multiplexer also includes a TDM bus 22, a central control module 23 and data link modules 24 and 25, in a manner similar to that described with respect to node 1. The data link module 24 provides node 2 communication with the link 13 and the data link module 25 provides node 2 communication with the link 14. Each of the data link modules 20, 21, 24 and 25 builds a TDM frame that is transmitted on the intercommunicating link to the connecting node. For example, the data link module 20 builds an outgoing frame from node 1 to node 2 for transmision on the link 13 as symbolized by an arrow 26. The data link module 20 also receives incoming frames along the link 13 built by the data link module 24 of node 2. This incoming transmission is symbolically indicated by an arrow 27.

The data link modules of the same node effect internal bi-directional communication therebetween via the node TDM bus. For example, the data link module 20 communicates with the data link module 21 via the TDM bus 15 as symbolically represented by an arrow 28. Similarly, the data link module 24 and the data link module 25 communicate with each other over the TDM bus 22 of node 2.

Thus, it is appreciated, that the channel 12 is carried by time slots of the frame built by the data link module 20 and transmitted to the data link module 24, time slots of the frame built by the data link module 24 and transmitted to the data link module 25 and time slots of the frame built by the data link module 25 and sent out over the link 14. The channel 12 is continued in a similar manner through nodes 3 and 4 (FIG. 1) to complete the channel 12 between the I/O devices 10 and 11.

FIG. 3 depicts a typical TDM frame illustrating the time slots numbered #1, #2, . . . ,#3860 in increasing time order. In a well known manner, the slots of the frame of FIG. 3 carry not only the user channels but also system bands such as synchronizing characters and one or more supervisory channels. In a manner to be described, the slots of the frame are assigned to the system bands and user channels utilizing the deterministic procedure of the present invention providing performance that has not heretofore been achieved.

Each of the data link modules 20, 21, 24 and 25 includes a processor for building the frame to be transmitted on the link associated therewith. For example, the data link module 20 includes a microprocessor 30 with an associated memory 31 coupled to an internal bus 32. Circuitry within the module 20 is included for communication by the microprocessor 30 with the T1 link 13, as indicated by the arrow 26 and with the TDM bus 15 as indicated by the arrow 28. The memory 31 includes a frame building procedure section 40 for controlling frame construction by the data link module 20 in accordance with the invention. The memory 31 further includes a slot assignment sequence table 41 for use by the frame building procedure section 40. The frame building procedure 40 enters slot assignments into the table 41 and reads slot assignments therefrom in implementation of the procedure. The arrangement of the slot assignment sequence table 41 is illustrated in FIG. 6 and will be later described. By way of example, the memory 31 also includes a channel assignment procedure section 42 for allocating the slots assigned in the table 41 to the channels requiring service on the network. A frame table 43 may be included in the memory 31 for use by the channel assignment procedure section 42. An example of a layout for the table 43 is illustrated in FIG. 7 and will be later described.

The frame building procedure section 40 implements the following slot assignment sequence generation process. Let N be the total number of slots in the frame including slots for system bands such as synchronizing characters and one or more supervisory channels. Initially, the frame is empty with the slots thereof to be assigned to the system bands and the user channels. N is assumed to be power of two. The procedure utilized when N is not a power of two will be later discussed. The slot assignment sequence is generated by a "binary rule" utilizing successive binary divisions. The slots of the frame are considered numbered in increasing time order as #1, #2, #3, . . . ,#N and the procedure is performed in iterations "I". A variable "s" is denoted as the sequence number of the slot assignment and "S(s)" is the slot number corresponding to s. The slot assignment sequence is generated as follows:

The first slot to be assigned (s=1) is slot #1.

In the first iteration, (I=1), add N/2 to the first assignment to obtain the next assignment; i.e., slot 1+(N/2).

In the second iteration, (I=2), add N/4 to the two assignments already obtained to provide the next two assignments. Thus, the next two assignments are (1)+(N/4) and (1+N/2)+(N/4).

In the third iteration, (I+3), add N/8 to the four assignments already obtained to provide the next four assignments. Thus, the next four assignments are (1)+(N/8), (1+N/2)+(N/8), (1+N/4)+(N/8), and (1+N/2+N/4)+(N/8).

In the fourth iteration, (I=4), add N/16 to the eight already produced assignments to obtain the next eight assignments, etc.

Continue as above until the ratio N/n becomes equal to 1. At that point, all N slots have been assigned.

The following is an example of the above procedure for a frame where N=32.

The first assignment is slot #1.

The next assignment is slot 1+N/2=1+32/2=17.

The next two assignments are 1+N/4=1+8=9 and 17+N/4=17+8=25.

The next four assignments are 1+N/8=1+4=5, 17+N/8=17+4=21, .9+N/8=9+4=13, and 25+N/8=25+4=29.

The next eight assignments are obtained by adding to the slot numbers of the eight already assigned slots, the quantity N/16=2. Thus, the next eight assignments are 3,19,11,27, 7,23,15 and 31.

The remaining sixteen assignments are obtained from the already obtained sixteen by adding the quantity N/32=1. Thus, the remaining sixteen assignments are 2,18,10,26,6,22,14, 30,4,20,12,28,8,24,16, and 32.

Figure 4:
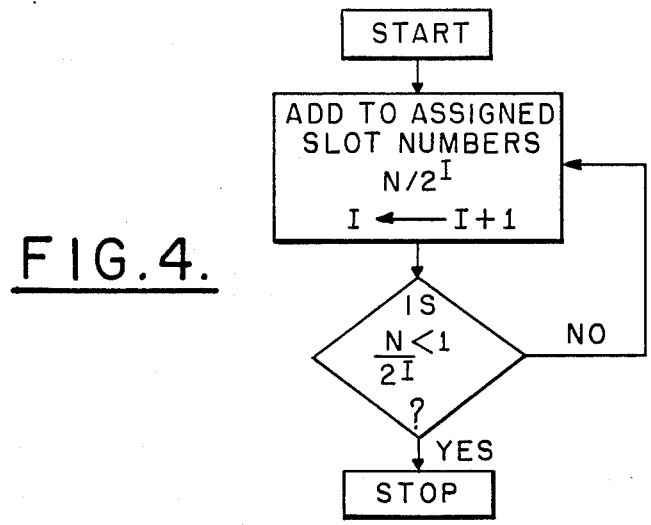
FIG. 4 is a flow chart depicting the frame building procedure of the present invention.

The frame building procedure of the present invention is generalized as depicted by the flow chart of FIG. 4. The procedure generates an N-entry table as illustrated in FIG. 6. As described above, iterations I are executed to generate the assignments. The flow chart of FIG. 4 assumes the initial conditions of I=1 and the set of assigned slots consisting only of slot #1 assigned as the first slot in the sequence. Thus, pursuant to the flow chart of FIG. 4, the procedure is generalized as follows:

Start with the first slot (#1).

Set I=1.

Add to the assigned slot number, $N/2^I$ to obtain the next assigned slot.

Increment I to I+1 add to the two already generated assignments the quantity $N/2^I$ to obtain the next two assignments.

Repeat for I=3,4,5, . . . thereby doubling the already produced assignments each iteration. The slot assignment sequence is stored in the table of FIG. 6 by storing the slot assignments during each iteration.

Continue until a total of N entries have been made in the table; i.e., until $I=\log_2 N$, where $N/2^I=1$.

Figure 5:
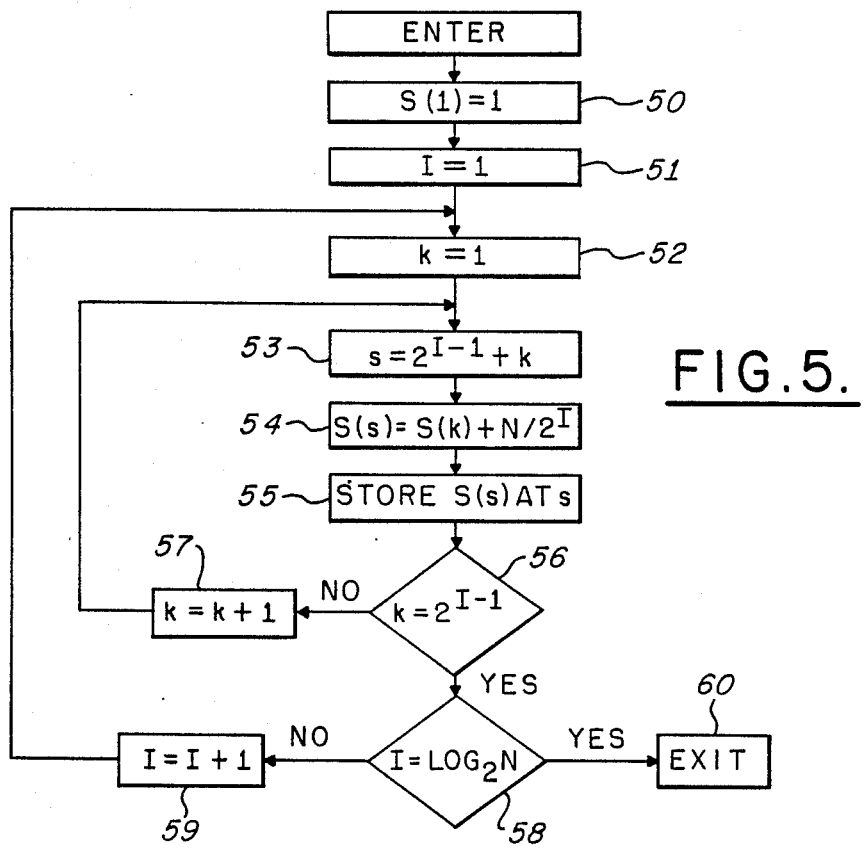
FIG. 5 is a flow chart illustrating details of the frame building procedure of the present invention.

Referring to FIG. 5, a detailed flow chart implemented by the frame building procedure 40 of FIG. 2 is illustrated. The procedure depicted in FIG. 5 constructs the slot number sequence table 41 as illustrated in FIG. 6. Pursuant to the flow chart of FIG. 5, the frame is assumed to have N slots and I is the iteration number. The slots in the frame are numbered in increasing time order as #1, #2, #3, . . . , #N and the slot number in the frame is denoted as S(s). where s is the slot assignment sequence number. Let k be a slot assignment sequence index. Starting with an empty frame, and thus an empty FIG. 6 table, the flow chart enters at a block 50 that assigns the slot #1 to the first position in the sequence. In a block 51, the iteration number I is set to 1 and in a block 52, the slot assignment sequence index k is set to 1. The slot assignment sequence number s is established in a block 53 and the slot number assigned to s is established in a block 54. The slot number S(s) assigned to s is stored pursuant to a block 55 at the appropriate location in the table 41 of FIG. 6. A block 56 tests if $k=2^{I-1}$. If not, k is incremented by unity in a block 57 and control is returned to the block 53 for generating the next slop assignment and table entry in the current iteration. If an iteration has been completed, the test block 56 follows the YES path to a block 58 that tests if $I=\log_2 N$. If inequality is detected in the block 58, the iteration index I is incremented by one in a block 59 and control is returned to the block 52 to generate the slot assignments and table entries in the next iteration. If equality is detected in the block 58, all of the slots in the frame N have been assigned and the table 41 of FIG. 6 is full. The flow chart of FIG. 5 then exits to a block 60.

Thus, as the flow chart of FIG. 5 executes the illustrated loops, the entries in table 41 of FIG. 6 are sequentially entered until the table is full. The block 54 of the flow chart of FIG. 5 references the table 41 for the values of S(k) in generating the new assignments S(s). The slot assignment sequence S(s) for the above example of N=32 is also illustrated in FIG. 6.

The procedure of the present invention is preferably applicable to frames where N is a power of 2. In a new system, the frames can be designed to meet this criterion. The present invention is also applicable to already designed TDM systems having any number of slots per frame. In systems where N is not a power of 2, if the quantity $N/2^I$ is an integer, the integer value is added to the already assigned slot numbers to generate the further assignments as described above. When $N/2^I$ is non-integral, the value is rounded to the nearest integer before the addition is performed. This may produce a one slot offset in the assignment as compared to a frame where N is a power of 2. Rounding can be effected to the nearest integer or all fractional quantities can be rounded up or rounded down to the nearest integer. The procedure is continued until all of the slots are filled utilizing as the last iteration I such that $2^I$ is the next higher power of 2 greater than N.

Care must be taken not to assign the same slot twice. If a step in the process yields a slot number that is already assigned, the closest adjacent empty slot is selected. With the procedure of the present invention, this empty slot will be contiguous to the occupied slot. Such collisions are minimized by rounding to the nearest integer rather than by rounding up or rounding down. It is appreciated that even though collisions may occur when N is not a power of 2, the procedure of the present invention in this case is still deterministic and thus fast, and utilizes the full bandwidth of the frame.

It is appreciated from the above that in the procedure of the present invention, two consecutively assigned slot (odd/even) are always separated by N/2 slots or half a frame. It is observed that the third assignment (1+N/4) in the slot assignment sequence is obtained by dividing by two the distance between the already assigned slots 1 and (1+N/2). Similarly, the fifth assignment (1+N/8) is obtained by dividing by two the distance between the already assigned slots 1 and (1+N/4). In the next step, the distance between slots (1+N/4) and (1+N/2) is subdivided by 2 to obtain the seventh assignment (1+N/8). The procedure continues by subdividing distances within the first half of the frame until attaining an equally distant arrangement for all assignments already effected. Thereafter, the next assignment is effected by dividing the left most distance (the earliest in time) by 2, etc.

As described above, the memory 31 includes the channel assignment procedure 42 and the frame table 43. The channel assignment procedure 42 allocates the number of slots required by each channel sequentially from the slot assignment sequence set forth in table 41 of FIG. 6. If no channel assignment have as yet been effected, the assignment begin from slot assignment sequence number 1, sequentially assigning the slots from the sequence to the first channel until the number of slots required by the first channel have been assigned. Slots are assigned to the next and subsequent channels sequentially from the slot assignment sequence beginning with the first unassigned slot in the sequence. If the frame is not full and a new channel is to be added to the system, the slot assignments therefor begin at the first unassigned slot in the sequence. For example, if a first channel to be assigned slots (channel #1) requires nine slots, the first nine slots (s=1–9) in the table are assigned to the channel. If a second channel to be assigned slots (channel #2) requires four slots, the next four consecutive slots (s=10–13) are assigned to the channel. FIG. 6 illustrates these assignments to channel #1 and channel #2.

It is appreciated that the frame building procedure 40 can be utilized to complete the table 41 prior to allocation of the slots to the channels. The assignments to the channels are then made sequentially from the table as required. Alternatively, the frame building procedure 40 may iteratively execute the procedure of FIG. 5 sequentially assigning the slots to the channel assignment procedure 42 wherein they are allocated to the channels as required thereby.

It is appreciated that the above-described sequence generation procedure only effects slots assignments. The frame building procedure 40 of FIG. 5 does not provide the sequence in which the slots allocated to the respective channels are utilized to carry data on behalf of the channels. The channel assignment procedure 42 allocates the slots to the channels requiring service thereby establishing the frame table 43 for storing the current channel assignments for the frame. The frame table 43 is, for example, arranged in slot number order (increasing time order) denoting the channel to which each slot is assigned. FIG. 7 illustrates the arrangement of the table 43 for a frame with N=32 carrying the exemplified channel #1 and channel #2, as described above. The channel assignment procedure 42 thus effectively orders the slots assigned to each channel in increasing time order so that the slots may carry consecutive data entities, such as consecutive characters, in increasing time order, respectively.

Referring to FIG. 8, the example given above of a frame with 32 slots carrying two channels (#1 and #2) requiring nine and four slots, respectively, is graphically depicted. The numbers in parenthesis indicate the slot assignment sequence for channel #1 and the numbers within brackets indicate the slot assignment sequence for channel #2. These slot assignments are shown in the table 41 of FIG. 6. Applying the procedure of the present invention to the channel #1 slot assignments results in the following:

(1) is the first slot of the frame—slot #1

(2) is half a frame away from (1)—slot #17
(3) is half way between (1) and (2)—slot #9
(4) is half a frame away from (3)—slot #25
(5) is half way between (1) and (3)—slot #5
(6) is half a frame away from (5)—slot #21
(7) is half way between (3) and (2)—slot #13
(8) is half a frame away from (7)—slot #29
(9) is half way between (1) and (5)—slot #3

The number within the brackets correspond to channel #2 and are obtained as follows by continuing the procedure after completion of the assignments for channel #1:

[10] Is half a frame away from (9)—slot #19
[11] Is half way between (3) and (7)—slot #11
[12] Is half a frame away from [11]—slot #27
[13] Is half way between (5) and (3)—slot #7

As described above, FIG. 7 illustrates the frame assignments and thus depicts the order in which the slots are utilized to carry data on behalf of the respective channels. For example, with respect to channel #2, the four assigned slots accommodate consecutive characters of the channel as follows:

[13] Carries character i
[11] Carries character i+1
[10] Carries character i+2
[12] Carries character i+3

It is appreciated that the time slot assignment procedure depicted by FIGS. 4 and 5 and embodied by the frame building procedure section 40 of FIG. 2, arranges the slots in the frame in an assignment sequence so that the slots can be allocated to the channels requiring service as required. Any procedure known in the TDM art may be utilized in allocating to the channels the slots as sequentially arranged by the present invention. The channel assignment procedure 42 and frame table 43 discussed above are described by way of example to perform this function.

The procedure of the present invention is collision free in that multiple assignments of the same slot are precluded. The procedure of the present invention also maximizes the dispersion of the slots assigned to each channel thereby limiting inter-character jitter to tolerable levels. These advantages are obtained while fully utilizing the frame bandwidth. Although the ideal or nominal dispersion of the slots assigned to a channel for jitter free operation is perfect uniformity, the present invention achieves the maximum uniformity possible while providing for full utilization of all of the slots of the frame.

With continued reference to FIGS. 6, 7 and 8, the distance between the successive frame slots assigned to a particular channel determines the inter-character distances for that channel. Generally, these distances deviate from the ideally uniform inter-character distance which is a function of the channel data rate. When expressed in terms of slots, the deviations are normalized with respect to the nominal inter-character distance (also expressed in terms of slots) to derive the inter-character jitter in terms of characters. With respect to the example given above of a frame with 32 slots, the four slots assigned to channel #2 would have ideal dispersion with an inter-character distance of eight slots. These ideal positions for the slots of channel #2 are indicated in FIG. 8 with astericks. It is observed that the distances resulting from utilizing the present invention are as follows:

Distance between [13] and [11] is four slots
Distance between [11] and [10] is eight slots
Distance between [10] and [12] is eight slots
Distance between [12] and [13] is twelve slots Thus, it is appreciated, that the inter-character jitter for channel #2 is +0.5 characters.

It has been determined that the inter-character jitter generated by utilizing the present invention does not exceed one character. In a sequence of tests performed, the maximum amount of jitter observed was 0.75 characters with typical jitter values being 0.5 characters. These values represent the jitter experienced by a channel when the frame format is designed such that the number of slots per frame is a power of 2.

As discussed above, the present invention is also applicable to already designed TDM systems having any number of slots per frame. In such cases, there is, in general, an additional jitter penalty of one to three characters depending on channels speed. It is appreciated that a TDM system may also experience jitter due to other sources depending on the manner in which the system is designed. If the system does not buffer the incoming frame (and thus dejitter), the additional jitter should be accommodated by well known techiques. This would apply, for example, to the 193-bit long frame in the case of T1 links.

It is appreciated from the foregoing that the present invention provides a fast deterministic frame building procedure for slot assignment in communication systems utilizing time division multiplexing. The procedure is predicated on a binary type rule providing slot assignment in a collision free manner. The preocedure bounds inter-character jitter to tolerable levels and permits full utilization of the bandwidth in the TDM frame. Since the present invention significantly increases the speed of the frame building process, fast reconnection and rerouting of disconnected channels is achieved when network failures occur. The prior art procedures utilize either a very time consuming trial and error search or excessively large bandwidth time slots resulting in inefficient bandwidth utilization. The procedure of the present invention achieves time slot assignments with extreme rapidity without sacrificing bandwidth utilization. Since the present invention utilizes all available bandwidth, a network incorporating the present invention may carry more channels than networks utilizing the prior art approaches. Thus, the prior art problems associated with channel bumping and bandwidth reservation are significantly obviated by the present invention. Even though adequate reserve bandwidth exists in the prior art, placement of a channel within the allowable jitter that the channel can sustain or tolerate is uncertain. With the present invention, when a new channel requires service, the previous assignments are retained and the new channel is overlayed on the system by continuing the above-described procedure from the last assignment made. Thus, when a new channel is connected into the network, it will not be necessary for the data link module to rebuild the frame. The new channel is simply assigned to the available unoccupied slots. If, however, a large number of the existing channels are disconnected, it may be desirable to rebuild the frame. With the present invention the frame is rebuilt very rapidly, consolidating the empty spaces caused by the disconnected channels.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Slot assignment apparatus for generating a slot assignment sequence in successive iterations I, where I is initially equal to 1, for a TDM frame having N slots with respective slot numbers #1, #2, #3, . . . ,#N in increasing time order and wherein said slots assigned in said sequence are allocatable to channels carried on said frame, said channels requiring predetermined numbers, respectively, of said assigned slots, comprising:

initial assignment means for assigning slot #1 as the first slot in said sequence, further assignment means operative during each said iteration for adding $N/2^I$ to said slot numbers of all previously assigned slots to generate further slot assignments in said sequence, iteration incrementing means for increasing I by 1 during each said iteration, iteration control means for performing said successive iterations so as to generate said slot assignment sequence, and channel allocating means for allocating said predetermined numbers of assigned slots to said channels, respectively.

2. The apparatus of claim 1 wherein said iteration control means comprises means for performing said successive iterations until $N/2^I$ is equal to 1 and all N slots are assigned in said sequence.

3. The apparatus of claim 2 wherein N is a power of 2.

4. The apparatus of claim 1 wherein said iteration control means comprises means for performing said successive iterations until $N/2^I$ is less than 1 and all N slots are assigned in said sequence.

5. The apparatus of claim 4 wherein N is not a power of 2.

6. The apparatus of claim 1 wherein said iteration control means comprises means for performing said successive iterations until said channels have said predetermined numbers of slots assigned thereto, respectively.

7. The apparatus of claim 1 wherein said further assignment means comprises means for generating said further slot assignments in the same order in which said all previously assigned slots were generated.

8. The apparatus of claim 7 further including slot assignment sequence table generating means responsive to said initial assignment means and said further assignment means for establishing a table of said slot numbers corresponding to said slot assignments in the order of said slot assignments in said slot assignment sequence.

9. The apparatus of claim 8 wherein said channel allocating means comprises means for allocating said predetermined numbers of slots to said channels, respectively, consecutively in the order stored in said table.

10. The apparatus of claim 7 wherein said channel allocating means comprises means for allocating said predetermined numbers of slots to said channels, respectively, consecutively as assigned in said sequence.

11. The apparatus of claim 7 further including frame table generating means responsive to said channel allocating means for generating a frame table correlating said N slots of said frame with said channels to which said assigned slots are allocated, thereby providing the order in which said assigned slots allocated to a channel convey data on behalf of said channel.

12. Slot assignment method for generating a slot assignment sequence in successive iterations I, where I is initially equal to 1, for a TDM frame having N slots with respective slot numbers #1, #2, #3, . . . ,#N in increasing time order and wherein said slots assigned in said sequence are allocatable to channels carried on said frame, said channels requiring predetermined numbers, respectively, of said assigned slots, comprising:

assigning slot #1 as the first slot in said sequence, adding, during each said iteration, $N/2^I$ to said slot numbers of all previously assigned slots to generate further slot assignments in said sequence, increasing I by 1 during each said iteration, performing said successive iterations to generate said slot assignment sequence, and allocating said predetermined numbers of assigned slots to said channels, respectively.

13. The method of claim 12 wherein said performing step comprises performing said successive iterations until $N/2^I$ is equal to 1 and all N slots are assigned in said sequence.

14. The method of claim 13 wherein N is a power of 2.

15. The method of claim 12 wherein said performing step comprises performing said successive iterations until $N/2^I$ is less than 1 and all N slots are assigned in said sequence.

16. The method of claim 15 wherein N is not a power of 2.

17. The method of claim 12 wherein said performing step comprises performing said successive iterations until said channels have said predetermined numbers of slots assigned thereto, respectively.

18. The method of claim 12 wherein said adding step includes generating said further slot assignments in the same order in which said all previously assigned slots were generated.

19. The method of claim 18 further including the step of establishing a slot assignment sequence table of said slot numbers corresponding to said assignments in the order of said slot assignments in said slot assignment sequence.

20. The method of claim 19 wherein said allocating step comprises allocating said predetermined numbers of slots to said channels, respectively, consecutively in the order stored in said slot assignment sequence table.

21. The method of claim 18 wherein said allocating step comprises allocating said predetermined numbers of slots to said channels, respectively, consecutively as assigned in said sequence.

22. The method of claim 18 further including the step of generating a frame table correlating said N slots of said frame with said channels to which said assigned slots are allocated, thereby providing the order in which said assigned slots allocated to a channel convey data on behalf of said channel.

* * * * *